March 24, 1925.

J. H. HAMMOND, JR 1,530,666

MULTIPLEX SYSTEM FOR THE TRANSMISSION OF RADIANT ENERGY

Original Filed Oct. 31, 1917

WITNESS:
Chas. F. Clagett

INVENTOR
John Hays Hammond Jr.
BY
A. J. Gardner
HIS ATTORNEY

Patented Mar. 24, 1925.

1,530,666

UNITED STATES PATENT OFFICE.

JOHN HAYS HAMMOND, JR., OF GLOUCESTER, MASSACHUSETTS.

MULTIPLEX SYSTEM FOR THE TRANSMISSION OF RADIANT ENERGY.

Application filed October 31, 1917, Serial No. 199,482. Renewed October 30, 1923.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Multiplex Systems for the Transmission of Radiant Energy, of which the following is a specification.

Some of the objects of this invention are to provide an improved selective system for the transmission of radiant energy whereby a plurality of messages or signals may be simultaneously transmitted through the medium of a single aerial circuit; and to provide other improvements as will appear hereinafter.

Figure 1:
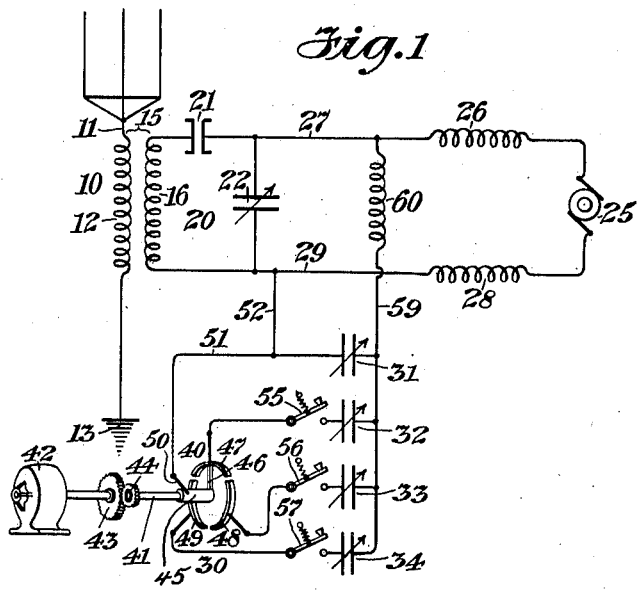
Figure 2:
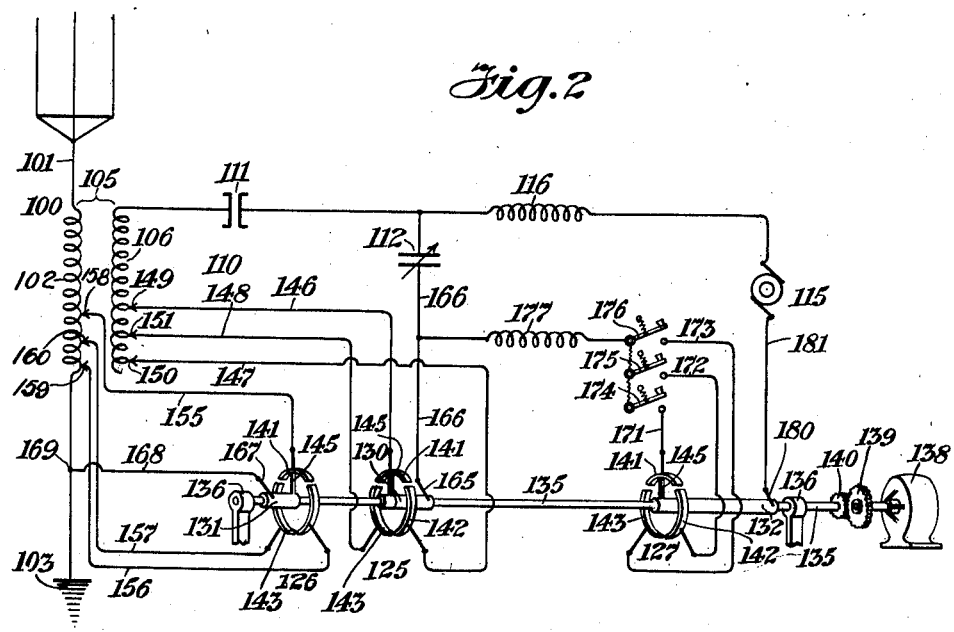

In the accompanying drawings, Fig. 1 is a diagrammatic representation of one form of transmission system constructed in accordance with this invention; and Fig. 2 is a diagrammatic representation of a modified form of transmission system constructed in accordance with this invention.

Referring to the drawings and particularly to Fig. 1, one form of transmission system constructed in accordance with this invention comprises an open, aerial circuit 10, including an antenna 11 and an inductance coil 12, through which the antenna 11 is grounded as at 13. The coil 12 forms the secondary of an oscillation transformer 15, which includes a primary coil 16. The coil 16 is inserted in a closed, oscillatory circuit 20, which contains a spark gap device 21 and a primary variable condenser 22. The circuit 20 is adjusted in such a manner as to transfer the maximum amount of energy to the aerial circuit 10 which may be normally tuned for instance, to 1,000,000 oscillations per second. The circuit 20 is arranged to be energized by means of a direct current electric generator 25 or any other suitable source of direct current, one pole of which is connected through a choke coil 26 and a conductor 27 to one side of the primary condenser 22, and the other pole of which is connected through a choke coil 28 and a conductor 29 to the other side of the primary condenser 22.

For selectively impressing upon the high frequency oscillations in the closed circuit 20 any one or more of a plurality of series of periodic amplitude variations having different predetermined frequencies respectively, a multiplex tone modifying device 30 is provided. This tone device 30 includes four variable condensers 31, 32, 33 and 34, which for convenience may be referred to hereinafter as the secondary condenser 31 and the first, second and third auxiliary condensers 32, 33 and 34. For automatically connecting the three auxiliary condensers 32, 33 and 34 successively with the secondary condenser 31 to control the secondary frequencies of the system, a commutator 40 is provided. The commutator 40 includes a shaft 41, which is arranged to be rotated about a fixed axis at a predetermined rate by any suitable means, for instance, by a motor 42 which is geared to the shaft 41 by means of a relatively large gear 43 rigidly secured to the shaft of the motor 42 and engaging a relatively small gear 44 rigidly secured to the shaft 41 of the commutator. Surrounding but insulated from the shaft 41 is a conducting sleeve 45 which has rigidly secured thereto and projecting radially therefrom a conducting arm 46. The arm 46 is arranged to engage successively three equal segmental fixed conductors 47, 48 and 49, which are co-axial with the shaft 41. These segmental conductors 47, 48 and 49 are spaced apart at such distances that as the arm 46 is rotated it will move out of engagement with one segmental conductor just before it moves into engagement with the succeeding segmental conductor. A fixed brush 50 is arranged to engage the sleeve 45 and is connected by a conductor 51 to one side of the secondary condenser 31, and this side of the secondary condenser is connected by a branch conductor 52 and the hereinbefore described conductor 29 to one side of the primary condenser 22. The three segmental conductors 47, 48 and 49 are arranged to be connected through three normally open keys 55, 56 and 57 to corresponding sides of the three auxiliary condensers 32, 33 and 34 respectively. The other sides of the secondary condenser 31 and the three auxiliary condensers 32, 33 and 34 are connected through a conductor 59, an inductance 60 and the hereinbefore described conductor 27 to the other side of the primary condenser 22.

In the operation of the transmission system shown in Fig. 1, the motor 42 is rotated at a rate such as to give the conducting sleeve 45 and its arm 46 any suitable rate of rotation, for instance, a rate of 1,000 revolutions per second, and the various condensers, coils and other elements of the system may be so adjusted that when the three keys 55, 56 and 57 are open as shown, the tone circuit, including the secondary condenser 31 and the inductance 60, will be caused to oscillate at a predetermined rate of, for instance, 40,000 oscillations per second, and so that when the three keys 55, 56 and 57 are alternatively closed this frequency of 40,000 per second will be changed successively to frequencies, of, for instance, 30,000, 25,000 and 20,000 per second respectively. With the system thus adjusted, when the three keys 55, 56 and 57 are open, the oscillations of 40,000 per second in the tone circuit comprising the secondary condenser 31 and the coil 60 will be impressed upon the high frequency oscillations of 1,000,000 per second in the closed circuit 20 and will consequently cause the open aerial circuit 10 to emit electro-radiant oscillations having a wave frequency of 1,000,000 per second and having imposed thereon a series of periodic amplitude variations having a frequency of 40,000 per second. If now the first key 55 should be closed, the frequency of the periodic amplitude variations would be changed periodically to 30,000 per second at the rate of rotation of the contact arm 46, the secondary frequency of 30,000 per second being continued on each cycle of rotation of the arm 46 as long as it is in engagement with the corresponding segmental conductor 47, which, as shown, would be slightly less than one-third of the time in which the system is in operation. In the same manner, if either of the other keys 56 or 57 should be closed while the remaining two keys were permitted to remain open, the frequency of the periodic amplitude variations would be periodically changed at a rate controlled by the rate of rotation of the arm 46 so as to give a periodic amplitude variation of the waves emitted having either a frequency of 25,000 or 20,000, depending upon which key 56 or 57 happened to be closed. If two or more of the keys 55, 56 and 57 should be closed simultaneously, corresponding successive variations in the frequency of the periodic amplitude variations of the emitted waves would be effected. The high rate of rotation does not cause the various frequencies to "co-exist"—these will occur one at a time and in sequence. The high rate of rotation will merely cause any one frequency to be interrupted at an audible rate.

It is therefore thought to be evident that the group transmission system shown in Fig. 1 might be utilized in connection with any suitable receiving system having a plurality of receiving telephones or other suitable receiving devices arranged to be controlled respectively by corresponding receiving circuits or receiving elements tuned respectively to the different secondary frequencies of, for instance, 30,000, 25,000 and 20,000 per second controlled by the transmission keys 55, 56 and 57, the receiving elements thus tuned being arranged to be selectively controlled as a result of the action of a single open aerial circuit tuned to the high frequency of, for instance, 1,000,000 per second of the transmission system.

In Fig. 2 is shown a modified form of transmission system which is constructed in accordance with this invention and includes an open aerial circuit 100 including an antenna 101 having in series therewith an inductance coil 102, through which the antenna is grounded as at 103. The coil 102 forms the secondary of an oscillation transformer 105 including a primary inductance coil 106, which is in a closed oscillatory circuit 110 including a spark gap device 111 and a variable condenser 112. The closed circuit 110 is arranged to be energized by any suitable source of direct current as, for instance, a direct current generator 115, one pole of which is connected through a choke coil 116 to one side of the variable condenser 112.

For selectively varying the frequency of the oscillations emitted by the open aerial circuit 100 by simultaneously and correspondingly varying the inductance 102 of the open aerial circuit 100 and the inductance 106 of the closed circuit 110, means are provided, including a primary commutator 125, a secondary commutator 126 and an auxiliary commutator 127. These commutators include respectively three co-axial conducting sleeves, 130, 131 and 132 which surround and are rigidly secured to but insulated from a shaft 135 arranged to be rotated in fixed bearings 136 at a predetermined rate of, for instance, 1,000 revolutions per second by any suitable means as, for instance, an electric motor 138. The motor rotates a comparatively large gear 139 about a fixed axis, this gear 139 being arranged to engage a relatively small gear 140, which is rigidly secured to one end of the shaft 135. Surrounding each sleeve 130, 131 and 132 and co-axial therewith is a series of fixed, spaced, conducting segments 141, 142 and 143, which are arranged to be consecutively engaged by corresponding conducting arms 145 rigidly secured to the corresponding sleeves 130, 131 and 132. The segmental conductors 141, 142 and 143 of the three commutators 125, 126 and 127, and the corresponding arms 145 are so arranged that the three arms 145 are moved simultaneously into and out of engagement with the corresponding segmental conductors 141, 142 and 143, that is, the arms 145 are moved simultaneously out of engagement with the segmental conductors 141, for instance, and are then simultaneously moved into engagement with the succeeding set of segmental conductors 142. The three segmental conductors 141, 142 and 143 of the primary commutator 125 are electrically connected respectively by conductors 146, 147 and 148 to three taps 149, 150 and 151 which are adjustably connected to the primary coil 106. The three segmental conductors 141, 142 and 143 of the secondary commutator 126 are connected respectively by three conductors 155, 156 and 157 to three taps 158, 159 and 160 which are adjustably connected to the secondary coil 102. The primary commutator 125 is provided with a fixed brush 165, which is connected by a conductor 166 to the side of the variable condenser 112 away from the spark gap 111. The secondary commutator 126 is provided with a fixed brush 167, which is arranged to engage the corresponding sleeve 131 and which is connected by a conductor 168 to the open aerial circuit 100 at a point 169 between the secondary coil 102 and the ground 103. The three segmental conductors 141, 142 and 143 of the auxiliary commutator 127 are arranged to be connected selectively to the conductor 166 between the variable condenser 112 and the brush 165 through three conductors 171, 172 and 173, three normally open keys 174, 175 and 176 respectively, and a choke coil 177. The auxiliary commutator 127 is provided with a fixed brush 180, which is connected by a conductor 181 to a corresponding terminal of the generator 115.

In the operation of the transmission system shown in Fig. 2, the arrangement is such that the primary and secondary coils 106 and 102 are so divided by the corresponding taps 149, 150 and 151, and 158, 159 and 160, that as the arms 145 of the commutators 125, 126 and 127 are rotated, the open aerial circuit 102 and the closed oscillatory circuit 110 will be successively varied in such a manner that these two circuits will be constantly in proper tune and so that the closed circuit 110 including the spark gap device 111, the variable condenser 112 and more or less of the primary coil 106 will be caused to oscillate successively at predetermined frequencies, for instance, 1,000,000, 800,000 and 900,000 per second, each time that the shaft 135 is rotated through a single revolution. The arrangement is such that when all three keys 174, 175 and 176 are open, the circuit through the generator 115 will be open, and consequently no oscillations will be produced in the closed circuit 110 or radiated from the open aerial circuit 100, but when any one of the keys 174, 175 or 176 is closed, oscillations having a corresponding frequency, for instance, of 1,000,000 per second, will be set up in the closed circuit 110 including the primary commutator 125, the coil 106, the spark gap device 111, and the variable condenser 112. For instance, when the key 174 is closed, the circuit through the generator 115 will be closed each time that the corresponding arm 145 passes over the corresponding segmental contact 141 of the auxiliary commutator 127, and at the same time the circuit will be closed through the corresponding portion of the primary coil 106, the spark gap device 111, the variable condenser 112, the brush 165, the sleeve 130, arm 145, segmental contact 141 of the primary commutator 125, conductor 146 and tap 149. Also at the same time the corresponding portion of the open aerial circuit will be short-circuited through the corresponding tap 158, segment 141, arm 145, sleeve 131, brush 167 of the secondary commutator 126, and the conductor 168, to maintain the open aerial circuit in syntony with the closed oscillatory circuit 110 as modified by the primary commutator 125. Each frequency must be received by a separate station tuned to that particular high frequency. The high rate of rotation will make this come in audible groups.

Although only two of the many forms in which this invention may be embodied have been shown herein and the corresponding methods of operation described, it is to be understood that this invention is not limited to any specific system or to any specific method of operation, but might be applied in various systems or various methods of operation without departing from the spirit of the invention or the scope of the appended claims.

Having thus fully described this invention, I claim:

1. In a system for transmitting radiant energy, the combination with means for producing a series of periodic radiant impulses having a frequency above audibility, of means for impressing periodic variations upon said impulses in a series interrupted at a rate within audibility and means for modifying said series of variations from time to time at the will of an operator to form a message.

2. In a system for transmitting radiant energy, the combination with means for producing a series of periodic radiant impulses having a frequency above audibility, of means for automatically impressing periodic variations of substantially constant frequency upon said impulses in a series interrupted periodically at a regular predetermined frequency within the range of audibility and means for modifying said series of variations from time to time at the will of an operator to form a message.

3. In a system for transmitting electric energy, the combination with a circuit, of means for producing in said circuit a series of periodic electrical impulses, means for periodically impressing on said series of impulses a series of periodic amplitude variations, said series of variations occurring intermittently at a rate within audibility, and means for selectively modifying said series of variations from time to time at the will of an operator to form a message.

4. In a system for transmitting electric energy, the combination with a circuit, of means for producing in said circuit a series of periodic electrical impulses, means for periodically impressing on said series of impulses a series of periodic amplitude variations, said series of variations occurring intermittently at a rate within audibility, and means for selectively interrupting said series of variations from time to time at the will of an operator to form a message.

5. In a system for transmitting electric energy, the combination with a circuit, of means for producing in said circuit a series of periodic electrical impulses, means for impressing upon said impulses in rotative sequence a plurality of series of periodic variations while maintaining the frequency of said impulses substantially constant, and means for modifying said plurality of series of variations from time to time at the will of an operator to form a plurality of different simultaneous messages, each of said series of variations occurring intermittently and at a rate within audbility.

6. In a system for transmitting energy the combination with means for producing a series of impulses having a frequency above audibility, of means for impressing upon said impulses periodically and at a rate within audibility, a series of periodic variations, and means for modifying said series of variations to form a message.

7. A transmission system in accordance with claim 6, in which the series of variations have a frequency substantially above audibility.

8. In a system for transmitting energy the combination with means for producing a series of periodic impulses having a frequency above audibility, of means for impressing upon said impulses periodically and at a rate within audibility a series of periodic variations, having a frequency substantially above audibility and means for modifying said series of variations to form a message.

9. A method of transmitting energy which consists in producing impulses having an ultra audible frequency, and impressing upon said impulses periodically at a substantially audible rate a series of impulses having a substantially inaudible frequency.

10. A method of transmitting energy which consists in producing impulses having an ultra audible frequency, and impressing upon said impulses periodically at a substantially audible rate a series of impulses having a substantially inaudible frequency and varying said second mentioned impulses to produce a signal.

11. In a multiplex system for transmitting electrical energy, the combination with a circuit, of means for producing in said circuit a series of periodic electrical impulses, means for impressing upon said impulses a plurality of series of periodic variations, and means for modifying said plurality of series of variations to form a plurality of different messages, each of said series of variations occurring intermittently and at a rate within audibility.

12. A system in accordance with claim 11 in which each of the series of variations has a substantially inaudible frequency.

13. In a multiplex system for transmitting energy, a combination with a circuit including a source of energy, of a tone circuit including an inductance and a condenser in series with said inductance and connected across said first mentioned circuit, a plurality of branch circuits, each containing an auxiliary condenser and a signalling device, and means including a commutator comprising a plurality of fixed contacts and a movable contact arranged to be automatically moved to engage said fixed contacts successively, to render each of said branch circuits intermittently operative at a rate within audibility and to cause said auxiliary condensers to cooperate successively with said first mentioned condenser.

14. A method of simultaneously transmitting a plurality of messages which consists in producing a series of impulses modified in rotational sequence at an audible rate in accordance with a plurality of successive series of differently characterized modifications and differently varying all of said series of modifications simultaneously to produce a plurality of messages.

15. A method in accordance with claim 14 in which the plurality of series of differently characterized modifications are produced in the form of a plurality of series of substantially ultra audible impulses.

16. In a system for transmitting energy, the combination with means for producing a series of impulses having a frequency above audibility, of means for impressing upon said impulses a series of periodic variations of substantially constant frequency, means for interrupting said series of variations periodically at a regular frequency within the range of audibility, and means controlled by said interrupting means for impressing a series of variations of a different frequency on said impulses.

This specification signed this 30th day of October A. D. 1917.

JOHN HAYS HAMMOND, Jr.